(12) United States Patent
Sturgin

(10) Patent No.: US 9,803,699 B2
(45) Date of Patent: Oct. 31, 2017

(54) SLIP CLUTCH ASSEMBLY

(71) Applicant: Schaeffler Technologies AG & Co. KG, Herzogenaurach (DE)

(72) Inventor: Todd Sturgin, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 170 days.

(21) Appl. No.: 14/833,339

(22) Filed: Aug. 24, 2015

(65) Prior Publication Data
US 2016/0076604 A1   Mar. 17, 2016

Related U.S. Application Data

(60) Provisional application No. 62/049,204, filed on Sep. 11, 2014.

(51) Int. Cl.
| | |
|---|---|
| *F16D 47/04* | (2006.01) |
| *F16D 41/08* | (2006.01) |
| *F16D 7/02* | (2006.01) |
| *F16D 47/02* | (2006.01) |

(52) U.S. Cl.
CPC ........... *F16D 7/027* (2013.01); *F16D 41/088* (2013.01); *F16D 47/02* (2013.01)

(58) Field of Classification Search
CPC ............................... F16D 47/04; F16D 41/086
See application file for complete search history.

(56) References Cited

U.S. PATENT DOCUMENTS

| | | | |
|---|---|---|---|
| 3,399,576 A | 9/1968 | Seilly et al. | |
| 6,129,189 A * | 10/2000 | Kerr | F02B 67/06 192/45.005 |
| 2007/0267264 A1* | 11/2007 | Pederson | F16D 41/066 192/45.018 |
| 2008/0149447 A1* | 6/2008 | Davis | F16D 41/069 192/45.1 |

* cited by examiner

*Primary Examiner* — Ramya Burgess
*Assistant Examiner* — Lillian Nguyen
(74) *Attorney, Agent, or Firm* — LeKeisha M. Suggs; Kevin L. Parks

(57) ABSTRACT

A slip clutch assembly includes a clutch carrier, a one-way clutch assembly, and a preloaded clutch assembly. The one-way clutch assembly has a portion fixed to the clutch carrier. The preloaded clutch assembly has a first clutch plate, a second clutch plate, and a resilient element. The first clutch plate is drivingly engaged with the carrier. The second clutch plate is arranged for driving engagement with a first portion of a transmission. The resilient element is for compressing the first and second clutch plates. In some example embodiments, the one-way clutch assembly has an outer race, an inner race, and a plurality of blocking elements. The outer race is fixed to the clutch carrier. The inner race is arranged to engage a second portion of the transmission. The blocking elements are selected from the group of rollers or sprags for selectively locking the outer race to the inner race and are disposed radially between the outer race and inner race.

16 Claims, 4 Drawing Sheets

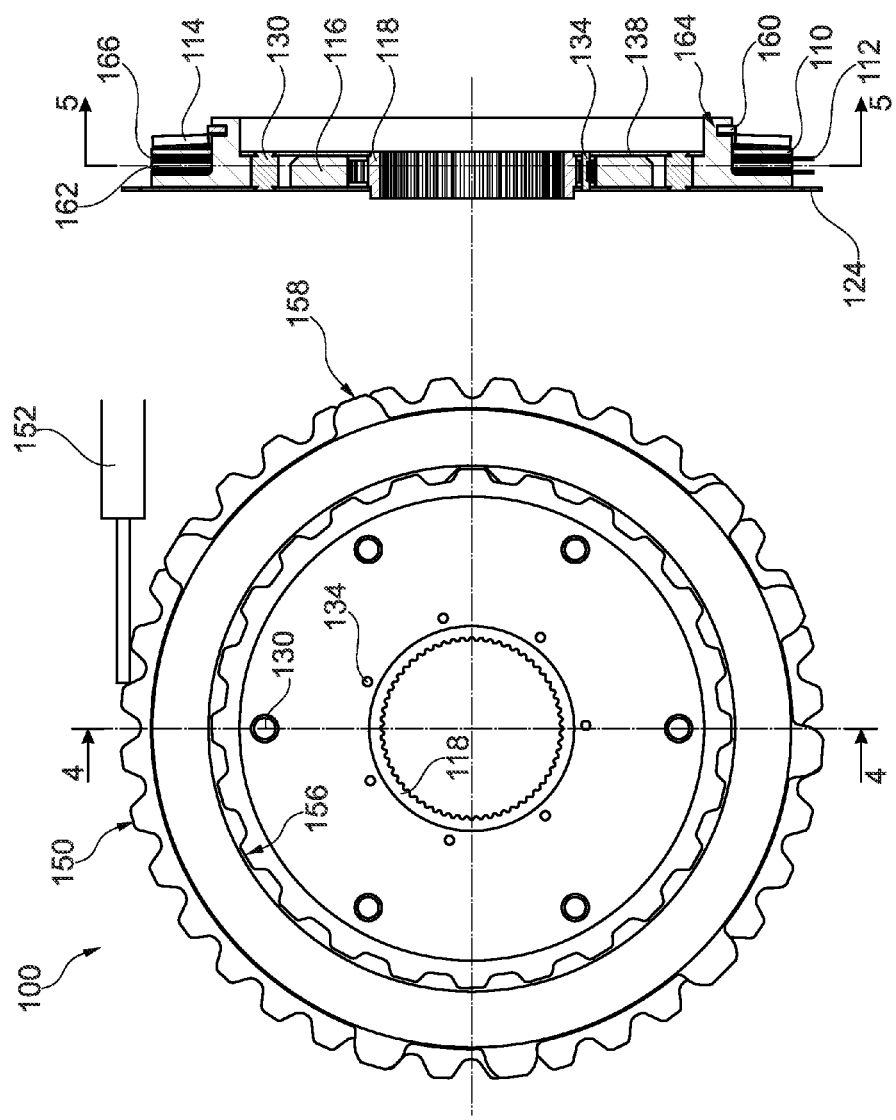

SLIP CLUTCH ASSEMBLY

FIELD

The invention relates generally to a clutch assembly, and more specifically to a slip clutch assembly for a transmission.

BACKGROUND

One way clutches and slip clutches are known. One example is shown in U.S. Pat. No. 3,399,576 to A. H. Seilly et al.

BRIEF SUMMARY

Example aspects broadly comprise a slip clutch assembly including a clutch carrier, a one-way clutch assembly, and a preloaded clutch assembly. The one-way clutch assembly has a portion fixed to the clutch carrier. The preloaded clutch assembly has a first clutch plate, a second clutch plate, and a resilient element. The first clutch plate is drivingly engaged with the carrier. The second clutch plate is arranged for driving engagement with a first portion of a transmission. The resilient element is for compressing the first and second clutch plates. In some example embodiments, the one-way clutch assembly has an outer race, an inner race, and a plurality of blocking elements. The outer race is fixed to the clutch carrier. The inner race is arranged to engage a second portion of the transmission. The blocking elements are selected from the group of rollers or sprags for selectively locking the outer race to the inner race and are disposed radially between the outer race and inner race.

In some example embodiments, the slip clutch assembly has a first side plate, a second side plate, and a plurality of connector elements. The first side plate is disposed on a first axial side of the slip clutch assembly. The second side plate is disposed on a second axial side of the slip clutch assembly. The plurality of connector elements fix the first side plate to the second side plate. In an example embodiment, the connector elements pass through apertures in the clutch carrier.

In some example embodiments, the slip clutch assembly has a plurality of pin elements disposed in respective apertures in the first and second side plates. The one-way clutch assembly comprises a race, the blocking elements are retained in the race, and the pin elements are for selectively rotating the race relative to the inner and outer race. In an example embodiment, the pin elements are disposed circumferentially between pairs of blocking elements. In an example embodiment, the one-way clutch assembly has a plurality of resilient elements for urging the blocking elements in a circumferential direction. Selectively rotating the race includes compressing the plurality of one-way clutch assembly resilient elements. In an example embodiment, one of the first side plate or the second side plate includes a tooth portion for being acted on by a portion of the transmission to rotate the pin elements to selectively rotate the race.

In some example embodiments, the clutch carrier includes a first spline portion and the first clutch plate includes second spline portion, complementary to and engaged with the first spline portion. In an example embodiment, the second clutch plate includes a toothed portion for driving engagement with the first portion of the transmission.

In some example embodiments, the slip clutch assembly has a snap ring. The clutch carrier has a backing rim and a groove. The first and second clutch plates are disposed axially between the backing rim and the groove. The resilient element is a diaphragm spring disposed axially between the first and second clutch plates and the groove. The snap ring is disposed in the groove to retain the resilient element to compress the clutch plates against the backing plate. In an example embodiment, the slip clutch assembly has a plurality of first and second clutch plates. The number of first and second clutch plates and a force of the resilient element are selected to permit the first clutch plates to rotate relative to the second clutch plates at a predetermined torque.

In an example embodiment, one of the first clutch plate or the second clutch plate comprises a friction material.

Other example aspects broadly comprise a slippable one-way clutch assembly for a transmission including a one-way clutch assembly and a preloaded clutch assembly in a torque path with the one-way clutch assembly to limit a torque transmitted by the slippable one-way clutch assembly. In some example embodiments, a first portion of the preloaded clutch assembly is arranged to be fixed to a transmission and a second portion of the preloaded clutch assembly is fixed to the one-way clutch assembly. In some example embodiments, the one-way clutch assembly is selectable between a lock mode in a first direction or a freewheel mode in the first direction. In an example embodiment, the one-way clutch assembly is arranged to be operated on by the transmission to select the lock mode or the freewheel mode.

BRIEF DESCRIPTION OF THE DRAWINGS

The nature and mode of operation of the present invention will now be more fully described in the following detailed description taken with the accompanying drawing figures, in which:

FIG. 3 is a front view of the slip clutch assembly 100 of FIG. 1;

FIG. 4 is a section view of the slip clutch assembly of FIG. 1 taken generally along line 4-4 in FIG. 3;

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
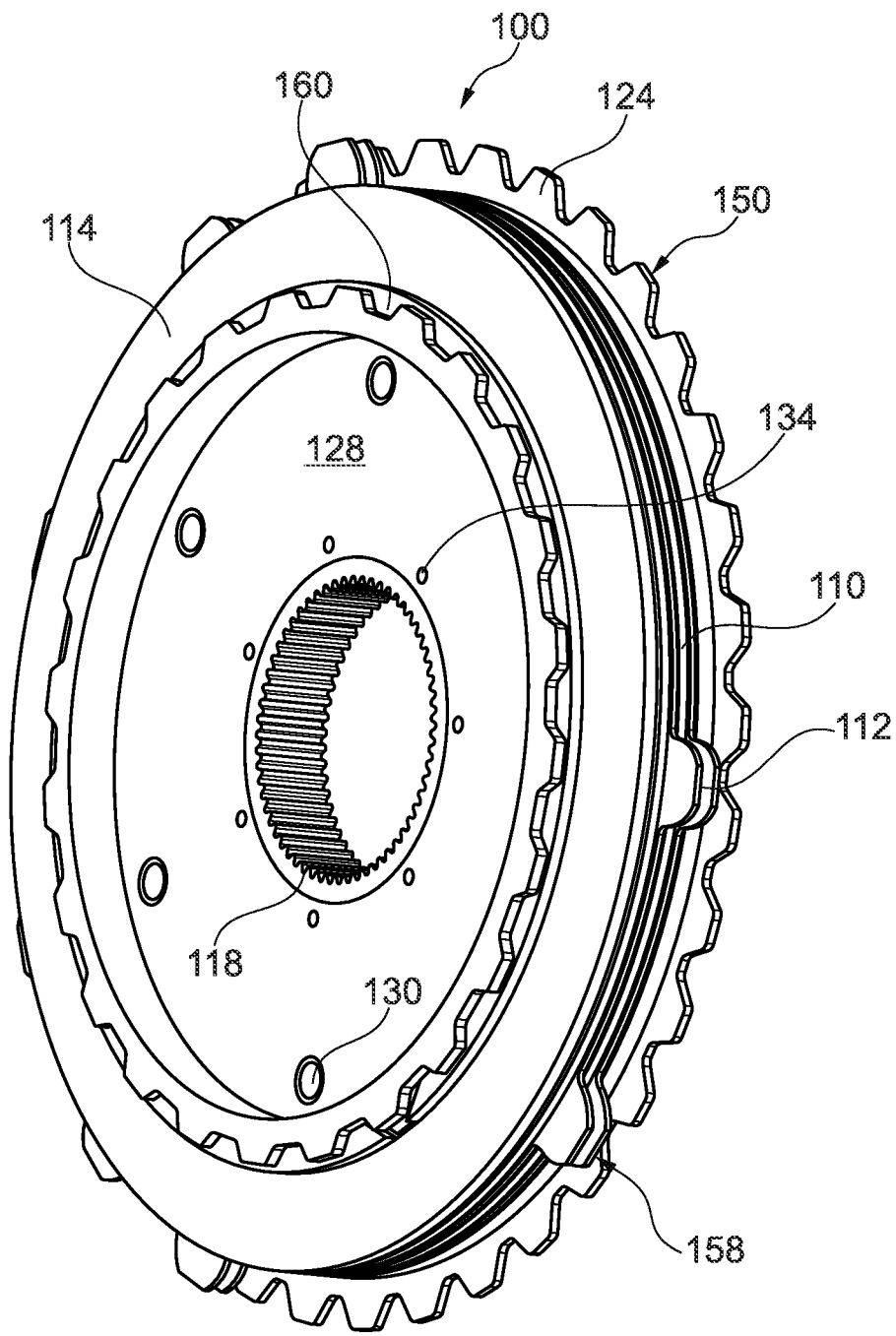
FIG. 1 is a perspective view of a slip clutch assembly according to an example aspect.
Figure 2:
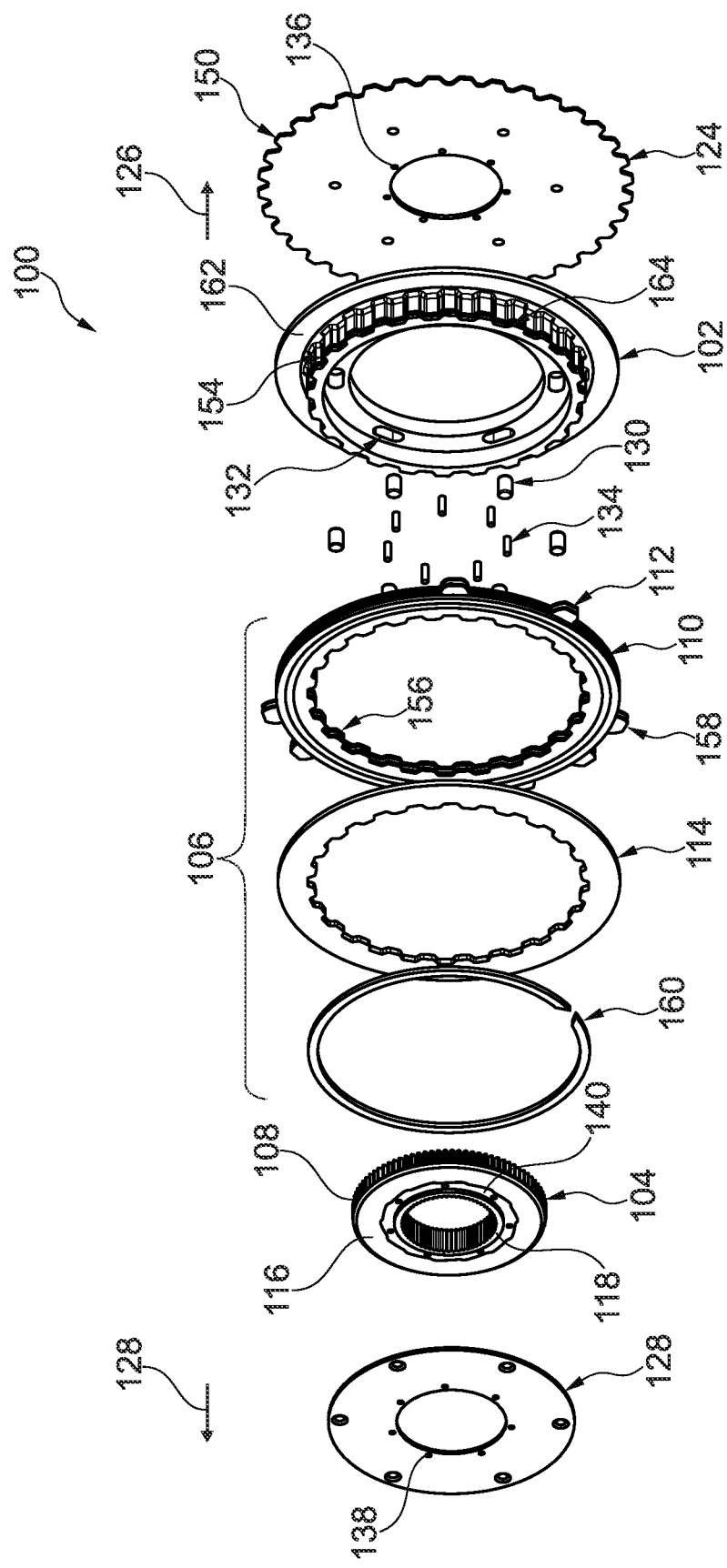
FIG. 2 is an exploded perspective view of the slip clutch assembly FIG. 1.

The following description is made with reference to FIGS. 1-4. FIG. 1 is a perspective view of slip clutch assembly 100. FIG. 2 is an exploded perspective view of slip clutch assembly 100 of FIG. 1. FIG. 3 is a front view of slip clutch assembly 100 of FIG. 1. FIG. 4 is a section view of slip clutch assembly 100 of FIG. 1 taken generally along line 4-4 in FIG. 3. Slip clutch assembly 100 includes clutch carrier 102, one-way clutch assembly 104 and preloaded clutch assembly 106. One-way clutch assembly 104 includes portion 108 fixed to the clutch carrier as described below. Preloaded clutch assembly 106 includes clutch plate 110 drivingly engaged with the carrier and clutch plate 112 arranged for driving engagement with a first portion of a transmission. Clutch plates 110 and 112 may be respective pluralities of clutch plates. Preloaded clutch assembly 106 includes resilient element 114 for compressing the clutch plates as described below. The resilient element may be a diaphragm spring, for example.

One-way clutch assembly 104 includes outer race 116 fixed to the clutch carrier by press-fitting, for example, inner race 118 arranged to engage a second portion of the transmission at spline 120, for example, and blocking elements, or rollers, 122 for selectively locking the outer race to the inner race. In some embodiments (not shown), blocking elements 122 may be sprag elements as is known in the art. The rollers are disposed radially between the outer race and inner race. Slip clutch assembly 100 includes side plate 124 disposed on axial side 126 of the slip clutch assembly and side plate 128 disposed on axial side 128 of the slip clutch assembly. Connector elements 130 fix side plate 124 to side plate 128. Connector elements 130 may be spacer rivets, for example. Elements 130 pass through apertures 132 in clutch carrier 102

Figure 5:
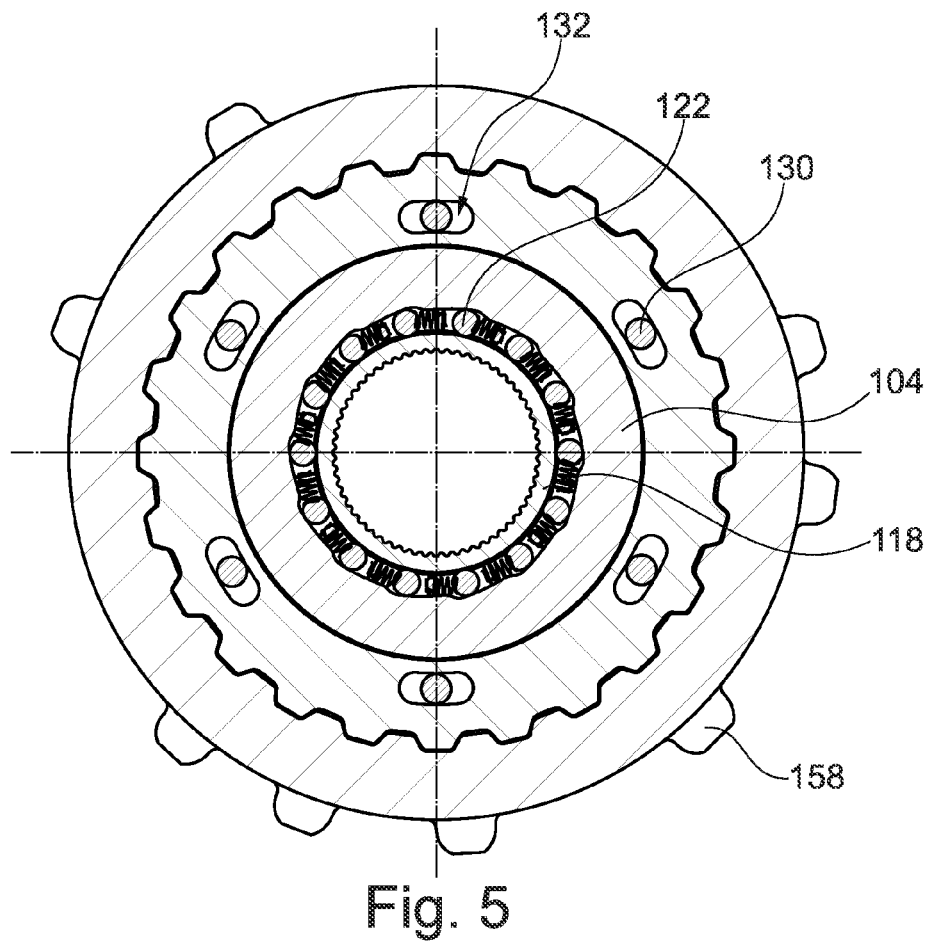
FIG. 5 is a section view of the slip clutch assembly of FIG. 1 taken generally along line 5-5 in FIG. 4.
Figure 6:
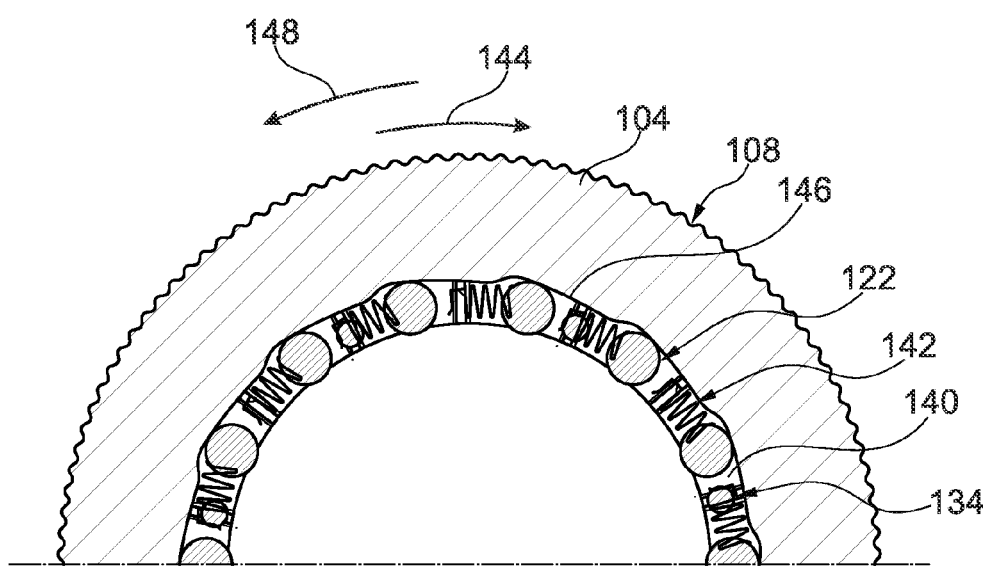
FIG. 6 is a detail section view of a one-way clutch assembly as depicted in FIG. 5.

The following description is made with reference to FIGS. 1-6. FIG. 5 is a section view of slip clutch assembly 100 taken generally along line 5-5 in FIG. 4. FIG. 6 is a detail section view of one-way clutch assembly 104 as depicted in FIG. 5. Slip clutch assembly 100 includes pin elements 134 disposed in apertures 136 and 138 in side plates 124 and 128, respectively. One-way clutch assembly 104 includes race 140 retaining rollers 122. That is, the race includes pockets for receiving respective rollers of the one way clutch so that the rollers are rotatable within the race but the rollers can be circumferentially positioned by the race relative to the inner and outer races.

Pin elements 134 are for selectively rotating the race relative to the inner and outer race. That is, the pin elements pass through respective receiving segments of the race disposed circumferentially between pairs of rollers so that, when the pin elements are rotated, the race is rotated and the rollers retained by the race are rotated. One-way clutch assembly 104 includes resilient elements, or accordian springs, 142 for urging the blocking elements in circumferential direction 144 as viewed in FIG. 6. That is, the springs urge the rollers into contact with ramps 146 of the outer race so that the one-way clutch assembly locks when the inner race is rotated in direction 144. Selectively rotating the race includes urging the rollers in direction 148, opposite direction 144, away from ramps 146, and compressing the accordian springs. This permits the one-way clutch assembly to freewheel when the inner race is rotated in direction 144 or 148. In other words, the one-way clutch remains unlocked.

Side plate 124 includes tooth portion 150 for being acted on by a portion of the transmission to rotate the pin elements to selectively rotate the race. That is, a transmission actuator includes plunger or arm 152 (ref. FIG. 3) that pushes or pulls on the teeth to rotate the pins and engage or disengage the one-way clutch. Tooth portion 150 advantageously allows ratcheting of the transmission actuator relative to the teeth so that, if the slip clutch slips as described below, the actuator can engage the next tooth, retaining the selective functionality of the one way clutch.

Clutch carrier 102 includes spline portion 154 and clutch plate 110 includes spline portion 156, complementary to and engaged with spline portion 154. Clutch plate 112 includes toothed portion 158 for driving engagement with the first portion of the transmission. In an example embodiment (not shown), teeth 158 are engaged with a portion of a case for the transmission so that clutch plate 112 is nonrotatable. Slip clutch assembly 100 includes snap ring 160. Clutch carrier 102 includes backing rim 162 and groove 164. Clutch plates 110 and 112 are disposed axially between the backing rim and the groove. Diaphragm spring 114 is disposed axially between the clutch plates and the groove. Snap ring 160 is disposed in the groove to retain the diaphragm spring to compress the clutch plates against the backing plate.

Clutch plate 112 includes friction material 166. As shown best in FIG. 2, preloaded clutch assembly 106 includes clutch plates 110 engaged with the carrier, and clutch plates 112 engageable with the transmission. Although two of each clutch plate are shown, other numbers of clutch plates are possible. The number of clutch plates and a force of the resilient element are selected to permit clutch plates 110 to rotate relative to clutch plates 112 at a predetermined torque. In other words, preloaded clutch assembly 106 is in a torque path with one-way clutch assembly 104 to limit a torque transmitted by slip clutch assembly 100, providing a slippable one-way clutch assembly.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

I claim:

1. A slip clutch assembly comprising:
   a clutch carrier;
   a one-way clutch assembly including a portion fixed to the clutch carrier; and,
   a preloaded clutch assembly comprising:
      a first clutch plate drivingly engaged with the carrier;
      a second clutch plate arranged for driving engagement with a first portion of a transmission; and,
      a resilient element for compressing the first and second clutch plates.

2. The slip clutch assembly of claim 1 wherein the one-way clutch assembly further comprises:
   an outer race fixed to the clutch carrier;
   an inner race arranged to engage a second portion of the transmission; and,
   a plurality of blocking elements selected from a group of rollers or sprags for selectively locking the outer race to the inner race and disposed radially between the outer race and the inner race.

3. The slip clutch assembly of claim 2 further comprising:
   a first side plate disposed on a first axial side of the slip clutch assembly;
   a second side plate disposed on a second axial side of the slip clutch assembly;
   a plurality of connector elements fixing the first side plate to the second side plate.

4. The slip clutch assembly of claim 3 wherein the connector elements pass through apertures in the clutch carrier.

5. The slip clutch assembly of claim 3 further comprising a plurality of pin elements disposed in respective apertures in the first and second side plates, wherein:
the one-way clutch assembly comprises a race;
the blocking elements are retained in the race; and,
the pin elements are for selectively rotating the race relative to the inner and outer race.

6. The slip clutch assembly of claim 5 wherein the pin elements are disposed circumferentially between pairs of blocking elements.

7. The slip clutch assembly of claim 5 wherein the one-way clutch assembly further comprises a plurality of resilient elements for urging the blocking elements in a circumferential direction and selectively rotating the race includes compressing the plurality of one-way clutch assembly resilient elements.

8. The slip clutch assembly of claim 5 wherein one of the first side plate or the second side plate includes a tooth portion for being acted on by a portion of the transmission to rotate the pin elements to selectively rotate the race.

9. The slip clutch assembly of claim 1 wherein:
the clutch carrier includes a first spline portion; and,
the first clutch plate includes a second spline portion, complementary to and engaged with the first spline portion.

10. The slip clutch assembly of claim 9 wherein the second clutch plate includes a toothed portion for driving engagement with the first portion of the transmission.

11. The slip clutch assembly of claim 1 further comprising a snap ring wherein:
the clutch carrier comprises a backing rim and a groove;
the first and second clutch plates are disposed axially between the backing rim and the groove;
the resilient element is a diaphragm spring disposed axially between the first and second clutch plates and the groove; and,
the snap ring is disposed in the groove to retain the resilient element to compress the clutch plates against the backing plate.

12. The slip clutch assembly of claim 11 further comprising a plurality of first and second clutch plates wherein the number of first and second clutch plates and a force of the resilient element are selected to permit the first clutch plates to rotate relative to the second clutch plates at a predetermined torque.

13. The slip clutch assembly of claim 1 wherein one of the first clutch plate or the second clutch plate comprises a friction material.

14. A slippable one-way clutch assembly for a transmission comprising:
a one-way clutch assembly; and,
a preloaded clutch assembly in a torque path with the one-way clutch assembly to limit a torque transmitted by the slippable one-way clutch assembly, wherein a first portion of the preloaded clutch assembly is arranged to be fixed to a transmission and a second portion of the preloaded clutch assembly is fixed to the one-way clutch assembly.

15. The slippable one-way clutch assembly of claim 14 wherein the one-way clutch assembly is selectable between a lock mode in a first direction or a freewheel mode in the first direction.

16. The slippable one-way clutch assembly of claim 15 wherein the one-way clutch assembly is arranged to be operated on by the transmission to select the lock mode or the freewheel mode.

\* \* \* \* \*